(12) United States Patent
Ueda (10) Patent No.: US 10,892,475 B2
(45) Date of Patent: Jan. 12, 2021

(54) MANUFACTURING METHOD OF NEGATIVE ELECTRODE

(71) Applicant: TOYOTA JIDOSHA KABUSHIKI KAISHA, Toyota (JP)

(72) Inventor: Masashi Ueda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/055,297

(22) Filed: Aug. 6, 2018

(65) Prior Publication Data

US 2019/0051888 A1 Feb. 14, 2019

(30) Foreign Application Priority Data

Aug. 8, 2017 (JP) ................................. 2017-153335

(51) Int. Cl.
| | | |
|---|---|---|
| *H01M 4/139* | (2010.01) | |
| *H01M 4/134* | (2010.01) | |
| *H01M 10/052* | (2010.01) | |
| *H01M 4/04* | (2006.01) | |
| *H01M 4/62* | (2006.01) | |
| *H01M 10/42* | (2006.01) | |

(Continued)

(52) U.S. Cl.
CPC .......... *H01M 4/139* (2013.01); *H01M 4/0402* (2013.01); *H01M 4/0404* (2013.01); *H01M 4/049* (2013.01); *H01M 4/134* (2013.01); *H01M 4/62* (2013.01); *H01M 4/621* (2013.01); *H01M 4/622* (2013.01); *H01M 10/052* (2013.01); *H01M 2/1673* (2013.01); *H01M 4/1393* (2013.01); *H01M 10/4235* (2013.01)

(58) Field of Classification Search
None
See application file for complete search history.

(56) References Cited

U.S. PATENT DOCUMENTS

| | | | |
|---|---|---|---|
| 2007/0190416 A1 | 8/2007 | Yamada et al. | |
| 2013/0149466 A1* | 6/2013 | Nakano | H01M 4/0404 427/557 |

(Continued)

FOREIGN PATENT DOCUMENTS

| | | |
|---|---|---|
| JP | 2005-239461 A | 9/2005 |
| JP | 2007-242590 A | 9/2007 |

(Continued)

*Primary Examiner* — Daniel S Gatewood
(74) *Attorney, Agent, or Firm* — Sughrue Mion, PLLC (57) ABSTRACT

A manufacturing method of a negative electrode includes: forming, on a belt-shaped copper foil, an active material film formed such that powder including a negative-electrode active material is moisturized and granulated into granulated bodies and the granulated bodies are formed into a film shape; applying a pasty heat resistant layer on the active material film; and drying the active material film and the heat resistant layer. In the applying, an HRL paste including a binder is applied as the heat resistant layer. The drying includes a first drying step, and second and third drying steps subsequent to the first drying step. A preset temperature of a first furnace used in the first drying step is a first temperature, and preset temperatures of a second furnace used in the second drying step and a third furnace used in the third drying step are a second temperature lower than the first temperature.

6 Claims, 5 Drawing Sheets

(51) Int. Cl.
*H01M 2/16* (2006.01)
*H01M 4/1393* (2010.01)

(56) References Cited

U.S. PATENT DOCUMENTS

2016/0172705 A1* 6/2016 Hoshiba ................ H01M 2/168
429/94
2016/0240839 A1* 8/2016 Umeyama ........... H01M 4/0435
2016/0308214 A1 10/2016 Umeyama et al.

FOREIGN PATENT DOCUMENTS

| JP | 2015-201318 A | | 11/2015 |
|----|---------------|---|---------|
| JP | 2015201318 A | * | 11/2015 |
| JP | 2016-119221 A | | 6/2016 |
| JP | 2016-201338 A | | 12/2016 |
| JP | 2017-103092 A | | 6/2017 |

* cited by examiner

| | PRESET TEMPERATURE OF FIRST FURNACE [°C] | ADDITIVE AMOUNT OF BINDER [wt%] | MIGRATION INDEX | BONDING STRENGTH [mN/cm] | INITIAL RESISTANCE RATIO |
|---|---|---|---|---|---|
| COMPARATIVE EXAMPLE | 120 | 10 | 1.20 | 6.1 | 1.0 |
| EXAMPLE 1 | 150 | 10 | 1.82 | 7.3 | 0.98 |
| EXAMPLE 2 | 180 | 10 | 2.20 | 9.5 | 0.98 |
| EXAMPLE 3 | 180 | 4 | 2.16 | 6.0 | 0.90 |

MANUFACTURING METHOD OF NEGATIVE ELECTRODE

INCORPORATION BY REFERENCE

The disclosure of Japanese Patent Application No. 2017-153335 filed on Aug. 8, 2017 including the specification, drawings and abstract is incorporated herein by reference in its entirety.

BACKGROUND

1. Technical Field

The disclosure relates to a manufacturing method of a negative electrode, the manufacturing method being for manufacturing a belt-shaped negative electrode by laminating a material including a negative-electrode active material on a metal foil.

2. Description of Related Art

For example, there is a belt-shaped electrode in which an active material layer is formed on a surface of a metal foil, as an electrode used for a lithium-ion secondary battery and the like. Further, there is a secondary battery using an electrode body in which a belt-shaped positive electrode and a belt-shaped negative electrode are laminated or wound with a separator being sandwiched therebetween. For example, Japanese Patent Unexamined Application Publication No. 2017-103092 (JP 2017-103092 A) describes, as a manufacturing method for laminating a sheet-shaped positive electrode and a sheet-shaped negative electrode with a sheet-shaped separator being sandwiched therebetween, a technique in which an adhesive is applied between the positive electrode and the separator and between the negative electrode and the separator.

SUMMARY

As described in JP 2017-103092 A, when a step of applying an adhesive is added, the number of manufacturing steps is increased just by the step thus added. For example, a heat resistant layer is applied onto a surface of an active material layer at the time of manufacture of a negative electrode plate. In view of this, when a material including a binder in addition to a material for the heat resistant layer is used as a coating material, for example, the step of applying an adhesive can be omitted. However, when a binder with an amount that can secure a sufficient bonding strength between a negative electrode plate and a separator is added, the resistance of a battery is increased by the binder, thereby resulting in that battery performance might decrease.

The disclosure provides a technique that can restrain a decrease in battery performance as a manufacturing method of a negative electrode, the manufacturing method including a step of applying, to a surface of an active material layer, a heat resistant layer to which a binder is added.

One aspect of the disclosure relates to a manufacturing method of a negative electrode, and the manufacturing method includes: forming, on a belt-shaped copper foil, an active material film formed such that powder including a negative-electrode active material is moisturized and granulated into granulated bodies and the granulated bodies are formed into a film shape; applying a pasty heat resistant layer onto the active material film; and drying the active material film and the heat resistant layer. In the applying of the heat resistant layer, a material to which a binder is added is applied as the heat resistant layer. The drying of the active material film and the heat resistant layer includes a first step and a second step performed subsequently to the first step. A drying temperature to be used in the first step is set to a first temperature. A drying temperature to be used in the second step is set to a second temperature lower than the first temperature.

In the manufacturing method according to one aspect, in the forming, the active material film in the film shape is deposited on the copper foil. After that, in the applying, the pasty heat resistant layer is applied onto the active material film, and then, in the drying, the active material film and the heat resistant layer are dried. Further, the material for the heat resistant layer includes the binder, and in the first step performed at an early stage of the drying, the active material film and the heat resistant layer are dried at the first temperature that is a high temperature. Accordingly, migration of the heat resistant layer is promoted, so that the binder gathers in the surface layer of the heat resistant layer. In the second step of the drying, the active material film and the heat resistant layer are dried at the second temperature that is lower than the first temperature, so that the active material film and the heat resistant layer can be dried surely in the state where the binder gathers in the surface layer. Hereby, the bonding strength can be secured without adding a large amount of the binder, thereby making it possible to restrain a decrease in battery performance.

In the manufacturing method according to one aspect, the first temperature may be 150° C. or more, and the second temperature may be 120° C. or less. When the active material film and the heat resistant layer are dried at 150° C. or more at the early stage of the drying, migration of the heat resistant layer is promoted. Further, when the second temperature is 120° C. or less, the copper foil is less likely to burn, for example.

Further, in the manufacturing method according to one aspect, the first temperature may be 180° C. When the active material film and the heat resistant layer are dried at 180° C. at the early stage of the drying, migration of the heat resistant layer is particularly promoted.

In the manufacturing method according to one aspect, the additive amount of the binder may be 10 wt %.

In the manufacturing method according to one aspect, the additive amount of the binder may be 4 wt %.

In the manufacturing method according to one aspect, the material to which the binder is added may include a filler, and the particle diameter of the binder may be smaller than the particle diameter of the filler.

In the manufacturing method according to one aspect, the binder may be acrylic-based emulsion.

With the disclosure, in terms of the manufacturing method of the negative electrode, including a step of applying, to the surface of the active material layer, the heat resistant layer to which the binder is added, a technique that can restrain a decrease in battery performance is attained.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The following describes an embodiment for embodying the disclosure in detail with reference to the attached drawings. The present embodiment is achieved such that the disclosure is applied to a manufacturing method for manufacturing a negative electrode by applying, to a surface of an active material layer, a heat resistant layer to which a binder is added.

Figure 1:
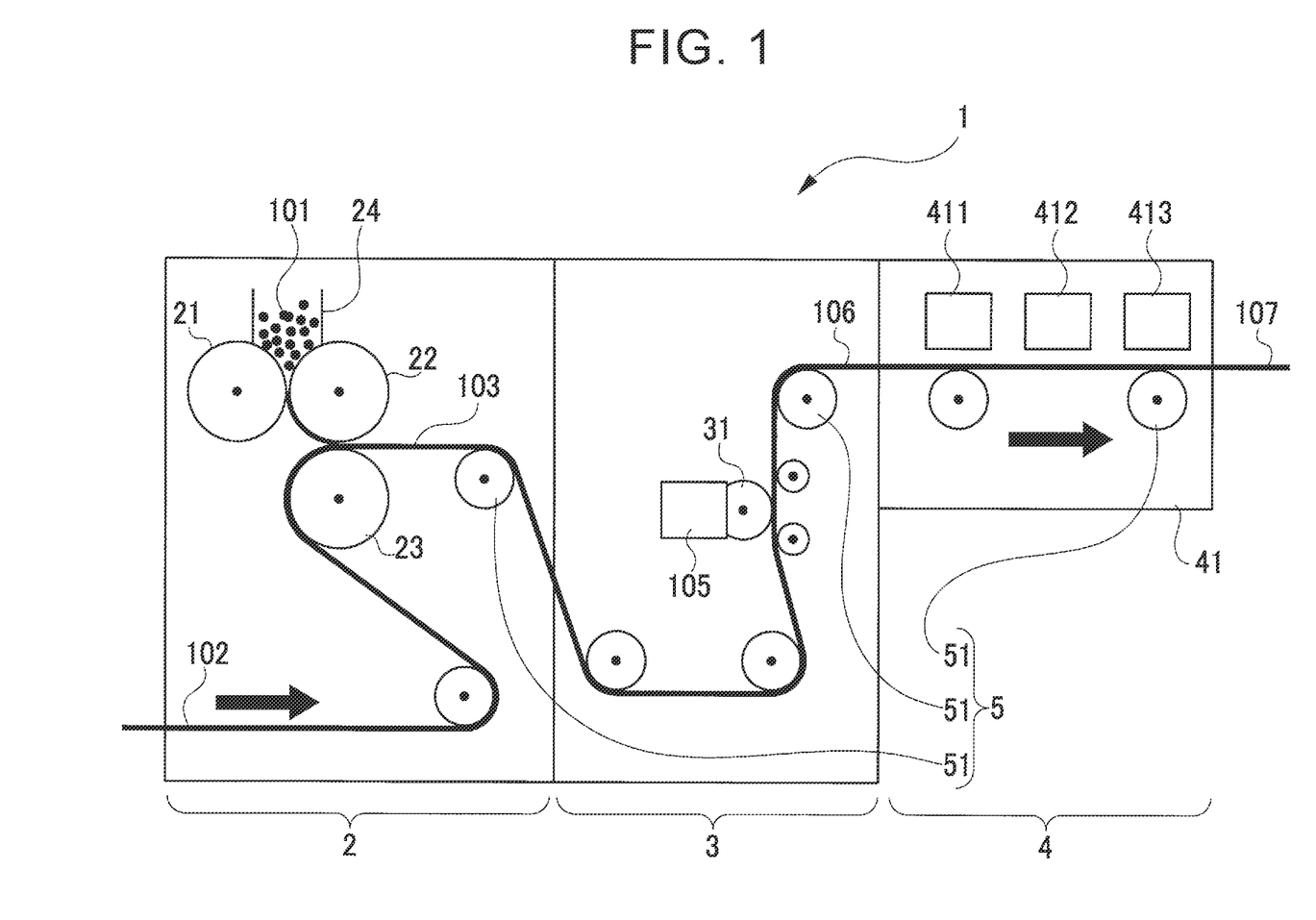
FIG. 1 is a schematic configuration diagram illustrating a manufacturing apparatus according to the present embodiment.

A schematic configuration of a manufacturing apparatus 1 used in the manufacturing method of the present embodiment is illustrated in FIG. 1. The manufacturing apparatus 1 is an apparatus for manufacturing a belt-shaped negative electrode in which a material including an electrode active material for a negative electrode is deposited on a copper foil. The manufacturing apparatus 1 includes a film forming device 2, a heat resistant layer (HRL) coating machine 3, a dryer 4, and a conveying device 5 as illustrated in FIG. 1.

As illustrated in FIG. 1, the film forming device 2 is a device including a plurality of rolls (an A-roll 21, a B-roll 22, a C-roll 23) and configured to form a laminated body 103 by depositing granulated bodies 101 on a copper foil 102. The granulated bodies 101 are obtained such that a small amount of solvent such as water is added to powder including a negative-electrode active material so that the powder is wet, and the powder is granulated generally in a spherical shape by stirring. The powder includes, for example, a carbonaceous material such as graphite, and may further include a thickener and a binder. A ratio of solid content in the granulated bodies 101 is 70% to 80%, for example. The copper foil 102 is a belt-shaped foil having a thickness of 10 μm to 20 μm, for example.

The A-roll 21, the B-roll 22, and the C-roll 23 are placed such that their rotating shafts are parallel to each other, as illustrated in FIG. 1. The A-roll 21 and the B-roll 22 are placed adjacent to each other, and the B-roll 22 and the C-roll 23 are placed adjacent to each other. The A-roll 21 and the C-roll 23 are not adjacent to each other. Note that, in the example of FIG. 1, the A-roll 21 and the B-roll 22 are placed adjacent to each other generally in the horizontal direction, and the B-roll 22 and the C-roll 23 are placed adjacent to each other generally in the vertical direction. However, the arrangement of the rolls is not limited to the example of FIG. 1.

The A-roll 21, the B-roll 22, and the C-roll 23 are connected to respective motors (not shown) that rotationally drive the A-roll 21, the B-roll 22, and the C-roll 23, so that they are rotated at respective predetermined rotation speeds at the time of manufacturing a negative electrode. Note that a common motor may be provided for the rolls or individual motors may be provided for the rolls. Rotation directions of the rolls are determined such that the outer peripheral surfaces of two adjacent rolls move in the same direction at the position where the two rolls are adjacent to each other. That is, the A-roll 21 and the C-roll 23 are rotated in the same direction, and the B-roll 22 is rotated in a rotation direction reverse to the A-roll 21 and the C-roll 23.

In the film forming device 2, the A-roll 21, the B-roll 22, and the C-roll 23 may have the same diameter, or the C-roll 23 having a diameter larger than the diameter of the A-roll 21 and the diameter of the B-roll 22 may be used. Further, the circumferential speeds of the rolls 21 to 23 in the film forming device 2 are determined, for example, such that the circumferential speed of the A-roll 21 is slowest, and the circumferential speed of the C-roll 23 is fastest. Note that the diameters and the rotation speeds of the rolls 21 to 23 should be selected appropriately from those suitable for manufacture of the negative electrode.

Further, as illustrated in FIG. 1, the film forming device 2 includes, between the A-roll 21 and the B-roll 22, a receptacle portion 24 in which the granulated bodies 101 are accommodated. At the time of manufacturing the negative electrode, the granulated bodies 101 are accommodated in the receptacle portion 24, and the copper foil 102 is wound around the C-roll 23. Then, the rolls 21 to 23 are rotated at respective determined rotation speeds, so that the granulated bodies 101 are formed into a film shape between the A-roll 21 and the B-roll 22. The granulated bodies 101 thus formed into the film shape are conveyed by the B-roll 22 and transferred to the copper foil 102 between the B-roll 22 and the C-roll 23. Hereby, the laminated body 103 in which the granulated bodies 101 are deposited on the copper foil 102 is formed.

The HRL coating machine 3 is a device including a gravure coater 31 as illustrated in FIG. 1 and configured to form an undried negative electrode 106 such that an HRL paste 105 is applied onto a film of the granulated bodies 101 in the laminated body 103 formed by the film forming device 2. As the gravure coater 31, a general gravure coater can be used. In FIG. 1, the HRL coating machine 3 applies the HRL paste 105 to the laminated body 103 moving from the lower side in the figure toward the upper side in the figure. However, the arrangement of the HRL coating machine 3 is not limited to this, and the HRL coating machine 3 may apply the HRL paste 105 to the laminated body 103 moving horizontally, for example.

The HRL paste 105 is obtained such that a material including a filler and a binder is dispersed in a solvent such as water so as to be formed into a paste form. The filler is boehmite, for example, and the binder is acrylic-based emulsion such as butyl acrylate, for example. The particle diameter of the binder is smaller than the particle diameter of the filler and is 1/10 or less of the particle diameter of the filler. The HRL paste 105 may further include a thickener.

As illustrated in FIG. 1, the dryer 4 includes a drying room 41 and three drying furnaces provided therein, i.e., a first furnace 411, a second furnace 412, and a third furnace 413. The dryer 4 is a device for forming a negative electrode 107 by drying the undried negative electrode 106 formed in the HRL coating machine 3. The first furnace 411, the second furnace 412, and the third furnace 413 are placed at regular intervals in this order from the upstream side in the moving direction of the undried negative electrode 106.

The dryer 4 heats the inside of the drying room 41 by the drying furnaces 411 to 413. In the dryer 4, the undried negative electrode 106 passes through the drying room 41 at a given speed in such a state where a surface, of the undried negative electrode 106, on which the HRL paste 105 is applied faces the drying furnaces 411 to 413. Respective drying temperatures are set in the drying furnaces 411 to 413, so that the drying furnaces 411 to 413 dry the undried negative electrode 106 facing them at the respective drying temperatures. In the present embodiment, the drying furnaces 411 to 413 are placed at regular intervals and a predetermined part of the undried negative electrode 106 faces each of the drying furnaces 411 to 413 for the same period of time.

As illustrated in FIG. 1, the conveying device 5 is a device including a plurality of conveyance rollers 51 and configured to continuously convey a belt-shaped member at a given speed. More specifically, the conveying device 5 passes the copper foil 102 that is a belt-shaped member supplied from a feed roller or the like (not shown) through the film forming device 2, the HRL coating machine 3, and the dryer 4 in this order. The conveying device 5 further conveys the negative electrode 107 formed by processing of the devices 2 to 4 to a winding roller or the like (not shown). Note that the C-roll 23 of the film forming device 2 and the gravure coater 31 of the HRL coating machine 3 also have a conveyance function and serve as a part of the conveying device 5. In the manufacturing apparatus 1 of the present embodiment, the film forming device 2, the HRL coating machine 3, the dryer 4, and the conveying device 5 perform a series of operations in combination.

Figure 2:
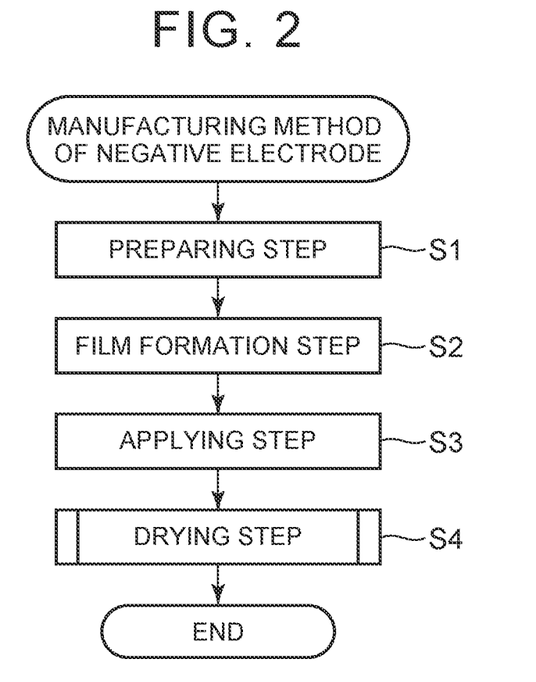
FIG. 2 is a process drawing illustrating steps in a manufacturing method according to the present embodiment.

Next will be described a manufacturing method for manufacturing a negative electrode by use of the manufacturing apparatus 1 of the present embodiment, with reference to the process drawing of FIG. 2. The manufacturing method is a manufacturing method for manufacturing the negative electrode 107 by performing a preparing step (S1), a film formation step (S2), an applying step (S3), and a drying step (S4) in this order as illustrated in FIG. 2.

In the preparing step (S1), the granulated bodies 101, the copper foil 102, and the HRL paste 105 are prepared. Then, as illustrated in FIG. 1, the granulated bodies 101 are accommodated in the receptacle portion 24, the copper foil 102 is wound around the C-roll 23, and the HRL paste 105 is put into the gravure coater 31. The copper foil 102 is set with an appropriate tension on a path passing through the C-roll 23, the gravure coater 31, and the drying room 41.

In the manufacturing method, after the preparing step (S1), the film forming device 2, the HRL coating machine 3, the dryer 4, and the conveying device 5 are operated at the same time, so that the film formation step (S2), the applying step (S3), and the drying step (S4) are performed in succession. That is, the rolls 21 to 23 of the film forming device 2, the gravure coater 31, and the conveyance rollers 51 of the conveying device 5 are rotated at respective predetermined rotation speeds.

In the film formation step (S2), the granulated bodies 101 are formed into a film shape between the A-roll 21 and the B-roll 22 due to rotation of the rolls 21 to 23 of the film forming device 2, so that an active material film is formed. Then, the active material film is conveyed by the B-roll 22 so as to be pressed against the copper foil 102 between the B-roll 22 and the C-roll 23, and thus, the laminated body 103 in which the granulated bodies 101 are deposited on the copper foil 102 is formed.

The laminated body 103 thus formed by the film forming device 2 is conveyed by the conveying device 5 so that a layer of the granulated bodies 101 faces the gravure coater 31. In the applying step (S3), the gravure coater 31 of the HRL coating machine 3 applies the HRL paste 105 onto the granulated bodies 101 in the laminated body 103. Hereby, the undried negative electrode 106 is formed.

Figure 3:
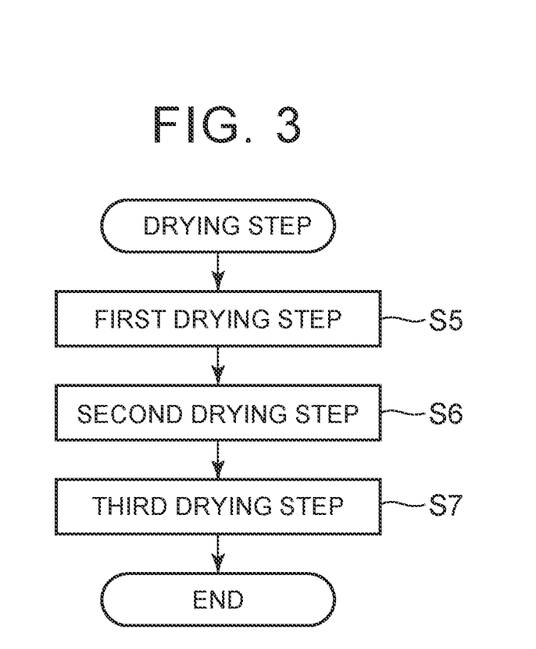
FIG. 3 is a process drawing illustrating a drying step.

The undried negative electrode 106 is conveyed by the conveying device 5 with the HRL paste 105 facing the drying furnaces 411 to 413. As illustrated in FIG. 3, the drying step (S4) includes a first drying step (S5), a second drying step (S6), and a third drying step (S7).

The first drying step (S5) is a step in which a predetermined part of the undried negative electrode 106 faces the first furnace 411 so as to be dried by the first furnace 411. The first drying step (S5) is an example of a first step. The second drying step (S6) is a step in which a predetermined part of the undried negative electrode 106 faces the second furnace 412 so as to be dried by the second furnace 412. The third drying step (S7) is a step in which a predetermined part of the undried negative electrode 106 faces the third furnace 413 so as to be dried by the third furnace 413. The second drying step (S6) and the third drying step (S7) are examples of a second step.

In the manufacturing method, a preset temperature of the first furnace 411 is higher than preset temperatures of the second furnace 412 and the third furnace 413. That is, a drying temperature of the first drying step (S5) that is an initial stage of the drying step is higher than drying temperatures of the second drying step (S6) and the third drying step (S7) that are subsequent steps. More specifically, the preset temperature of the first furnace 411 is 150° C. to 180° C., for example, and the preset temperatures of the second furnace 412 and the third furnace 413 are 100° C. to 120° C., for example. The preset temperature of the first furnace 411 is an example of a first temperature and the preset temperatures of the second furnace 412 and the third furnace 413 are examples of a second temperature.

The first temperature is a temperature having a high risk that the copper foil 102 of the undried negative electrode 106 burns before the undried negative electrode 106 finishes passing through the drying room 41 in a case where three drying furnaces 411 to 413 are all set to the first temperature. In the meantime, the second temperature is a temperature at which the drying of the undried negative electrode 106 is finished before the undried negative electrode 106 finishes passing through the drying room 41 in a case where the three drying furnaces 411 to 413 are all set to the second temperature. The second temperature has a low risk that the copper foil 102 burns.

Figure 4:
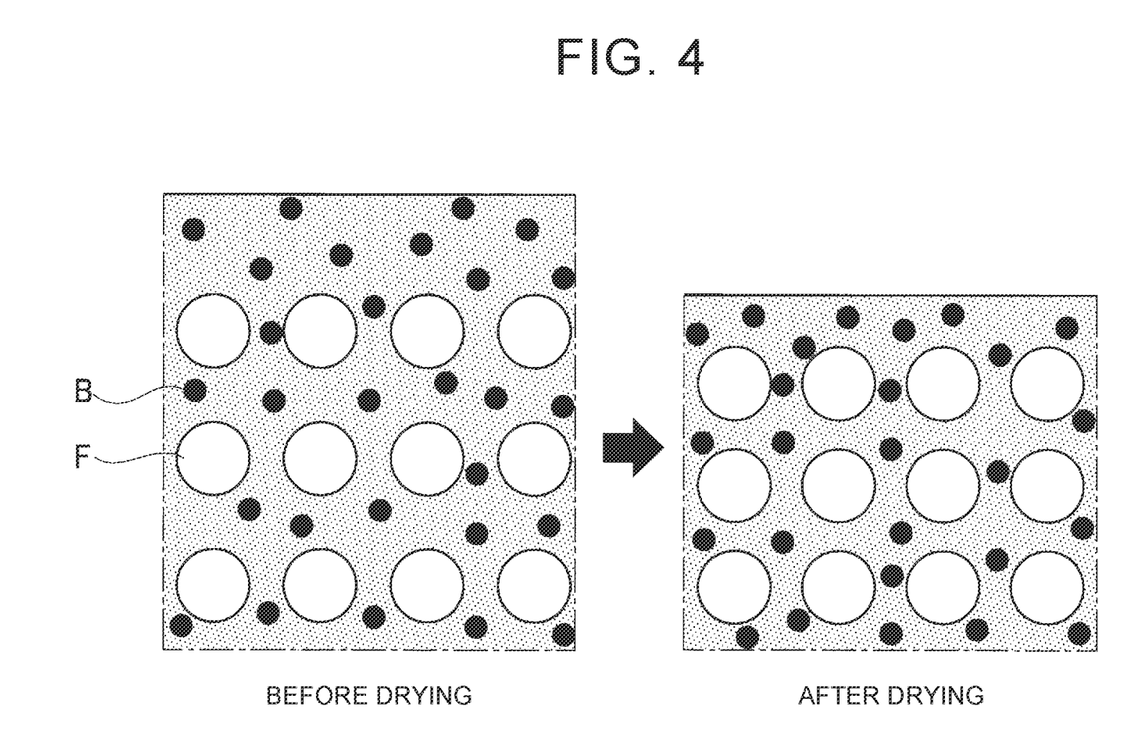
FIG. 4 is an explanatory view illustrating migration.

When the undried negative electrode 106 to which the paste including a liquid solvent is applied is dried at a high temperature, migration is promoted by solvent evaporation as illustrated in FIG. 4. FIG. 4 is an explanatory view schematically illustrating changes due to migration. As illustrated in FIG. 4 as a state after drying, even after the amount of solvent is decreased by drying, fillers F with a large particle diameter are placed dispersedly as a whole. In the meantime, binders B with a small particle diameter are moved by a capillary force to gaps caused due to rapid evaporation of the solvent. That is, when the migration is promoted, the binders B with a small particle diameter tend to gather in a surface layer. The migration is particularly promoted at the time when the temperature rapidly increases in the state where the amount of solvent is large.

By the time the third drying step is finished and the undried negative electrode 106 finishes passing through the drying room 41, the solvent included in the HRL paste 105 and the granulated bodies 101 of the undried negative electrode 106 evaporates and dries, so that the undried negative electrode 106 is turned into the negative electrode 107. When the undried negative electrode 106 is dried at a high temperature in the first drying step performed first in the drying step, the binder included in the HRL paste 105 moves to the surface layer, so that a binder layer including a large amount of binder components is formed on the surface of the negative electrode 107 after the drying step. In the meantime, the solvent of the granulated bodies 101 also evaporates. However, since the granulated bodies 101 that are granulated in advance are used, the migration in the layer of the granulated bodies 101 is restrained. That is, binders included in the granules of the granulated bodies 101 are restrained from moving outside the granules.

In the manufacturing method of the present embodiment, only the first furnace 411 is set to a high temperature, and the second furnace 412 and the third furnace 413 are set to a temperature lower than that of the first furnace 411, so the copper foil 102 of the negative electrode 107 is less likely to burn. Note that the preset temperature of the second furnace 412 and the preset temperature of the third furnace 413 may be the same temperature or may be different temperatures as long as they are lower than the preset temperature of the first furnace 411.

The negative electrode 107 thus manufactured by the manufacturing apparatus 1 is wound or laminated with a positive electrode and a separator manufactured separately from the negative electrode 107, and then sealed in a container with an electrolytic solution. Thus, a secondary battery is manufactured. At this time, the separator is put on the HRL paste 105 side of the negative electrode 107. As described above, the binder layer including a large amount of binder components is formed in the surface layer of the negative electrode 107. Accordingly, the adhesive strength between the negative electrode 107 and the separator is secured by the binder layer. On this account, it is not necessary to add a step of applying an adhesive to the negative electrode 107 thus manufactured.

Next will be described experiment results of comparison in performance between batteries manufactured by use of negative electrodes in examples, the negative electrodes being manufactured by the manufacturing method of the present embodiment. First, as a comparative example, a battery was manufactured by use of a negative electrode manufactured such that the preset temperatures of the drying furnaces 411 to 413 were all set to 120° C. Subsequently, the preset temperature of the first furnace 411 was changed and negative electrodes of Examples 1 to 3 were manufactured, and then, batteries were manufactured by use of the negative electrodes.

In each of the examples, the granulated bodies 101 were formed in a granular shape by mixing and stirring the following materials.
Negative-Electrode Active Material: Amorphous Carbon Coated Graphite
Thickener: CMC
Solvent: ion-exchange water In each of the examples, the HRL paste 105 was formed by use of the following materials.
Filler: boehmite
Thickener: CMC
Binder: acrylic-based emulsion (with an average particle diameter of 200 nm)
Solvent: ion-exchange water The manufacturing procedure of the HRL paste 105 in each of the examples is (1) to (3) as follows.
(1) CMC dissolution: CMC is added to ion-exchange water and CMC is dissolved by ultrasonic dispersion. (2) Filler dispersion: Boehmite is added to (1) and boehmite is dispersed by ultrasonic dispersion. (3) Binder mixing: The binder is added to (2) and the binder is mixed by ultrasonic dispersion. In the comparative example, Example 1, and Example 2, the additive amount of the binder was 10 wt % of the HRL paste 105, and in Example 3, the additive amount of the binder was 4 wt % of the HRL paste 105, as will be described later.

In each of the examples, the negative electrode was manufactured by the manufacturing apparatus 1 described above. (1) The granulated bodies 101 are deposited on the copper foil 102 in the film forming device 2. (2) In the HRL coating machine 3, the HRL paste 105 formed in the above procedure is applied onto the layer of the granulated bodies 101. (3) The undried negative electrode 106 to which the HRL paste 105 is applied is dried in the dryer 4. The dryer 4 used in the experiment includes three drying furnaces 411 to 413, and a drying time in each of the furnaces is approximately three seconds. Only the preset temperature of the first furnace 411 was made different between the examples, and the preset temperatures of the second furnace 412 and the third furnace 413 were set to 120° C. in all the examples.

Further, in the experiment, the manufactured negative electrode was cut and the binder on the section was mapped, so that a ratio of the binder included in the surface layer was calculated. In the following description, a calculation value of the ratio of the binder in the surface layer is assumed a migration index. The migration index has a larger value as a larger amount of the binder, out of the added binder, gathers in the surface layer of the manufactured negative electrode. The migration index is an index indicative of a migration promotion degree.

The manufactured negative electrode was attached to a separator by a roll press machine, and a bonding strength after the attachment was measured. The bonding strength was measured by a peeling test by use of a peeling test machine under the environment of 90° C. Note that a target bonding strength between the negative electrode and the separator is 5 mN/cm.

Further, a laminated body in which the negative electrode was attached to the separator was wound with a positive electrode formed separately from the laminated body, so that an electrode body was manufactured. Then, the electrode body and an electrolytic solution were sealed in a laminated container, and thus, a laminated cell battery was manufactured. The manufactured battery was charged, and a voltage value and a current value in the first discharge were measured. Based on the measurement result, an initial resistance value was calculated. A battery with a smaller initial resistance value is a battery with a better battery performance. Further, a ratio of the initial resistance value in each of the examples to the initial resistance value of the comparative example was found as an initial resistance ratio. The initial resistance ratio of the comparative example is 1.0.

Figure 5:
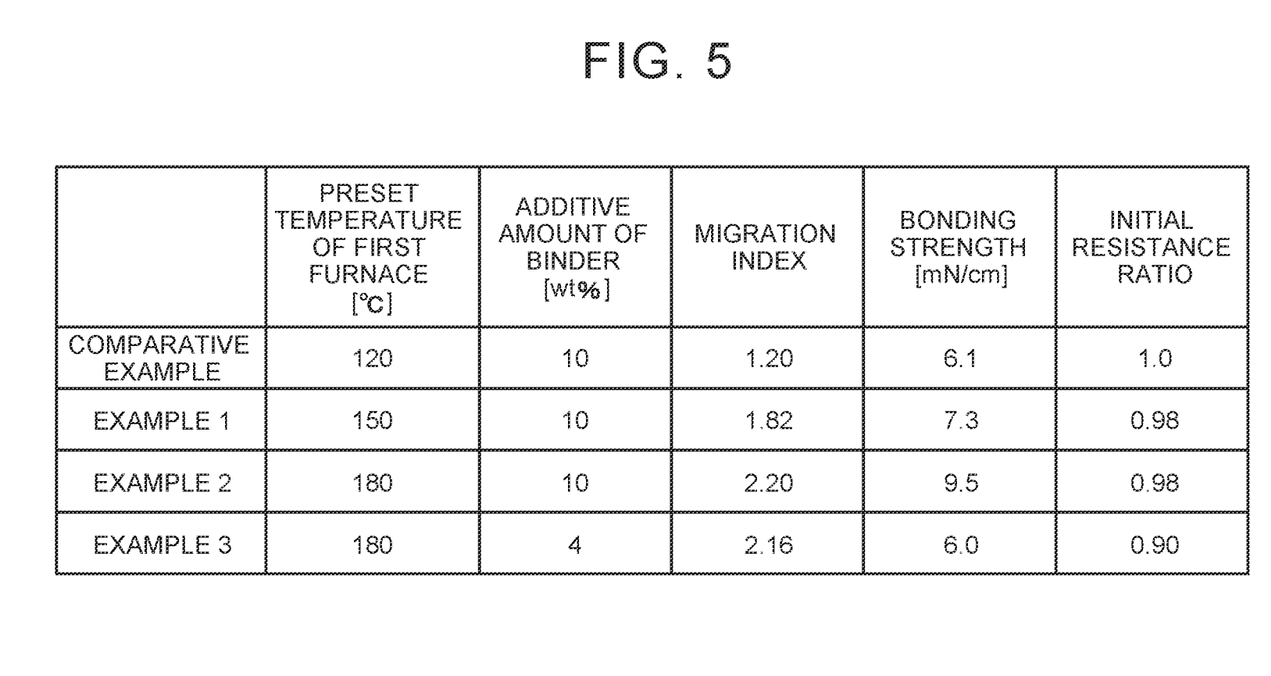
FIG. 5 is a table illustrating experimental results.
Figure 6:
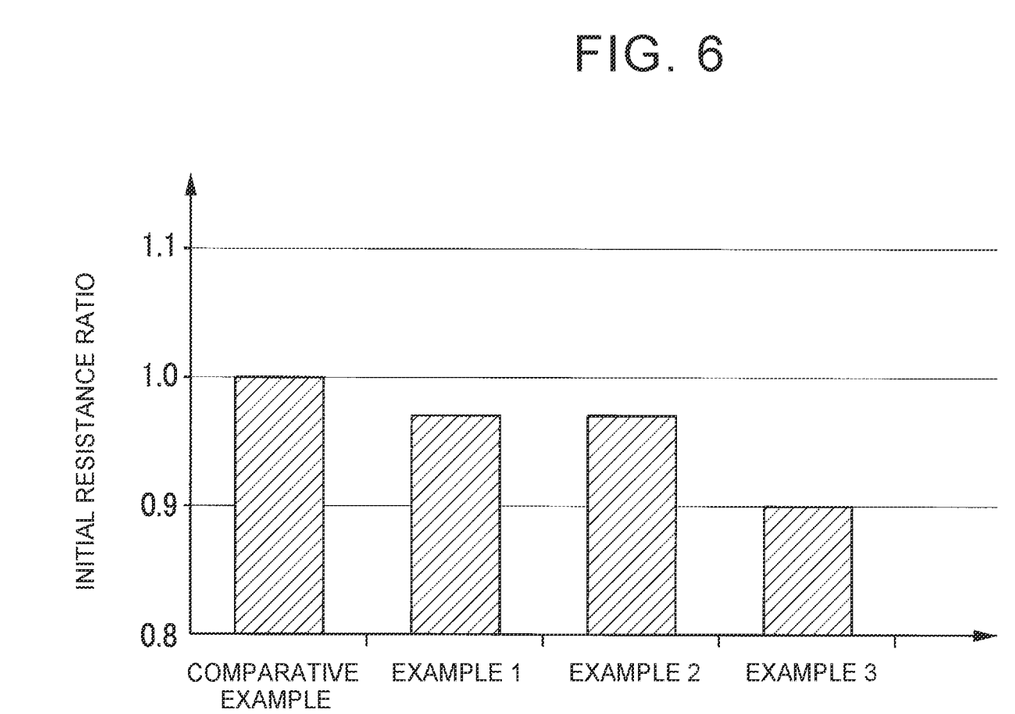
FIG. 6 is a graph illustrating an initial resistance ratio.

Experimental results are shown in FIGS. 5 and 6. FIG. 5 is a table showing values of a migration index, a bonding strength, and an initial resistance ratio of each of the examples. FIG. 6 is a graph of the initial resistance ratio of each of the examples. The comparative example is an example in which the preset temperatures of all furnaces were set to 120° C. and the binder of 10 wt % was added. As illustrated in FIG. 5, a sufficient bonding strength was also provided in Comparative Example 1.

A negative electrode in Example 1 is a negative electrode manufactured such that the preset temperature of the first furnace 411 was set to 150° C. and the binder of 10 wt % was added. A negative electrode in Example 2 is a negative electrode manufactured such that the preset temperature of the first furnace 411 was set to 180° C. and the binder of 10 wt % was added. In Example 1 and Example 2, their initial resistance ratios were 0.98 that was improved from the comparative example. That is, it was confirmed that the battery performance was improved by setting the preset temperature of the first furnace 411 to 150° C. to 180° C.

Further, as illustrated in FIG. 5, the migration index and the bonding strength of Example 2 were larger than those in Example 1. That is, under the condition of Example 2, even if the additive amount of the binder is reduced, the bonding strength may be secured. In view of this, as Example 3, a negative electrode was manufactured under the condition of Example 2 with a reduced additive amount of the binder, and its battery performance was examined. The negative electrode in Example 3 is a negative electrode manufactured such that the preset temperature of the first furnace 411 was set to 180° C. and the additive amount of the binder was 4 wt %. As illustrated in FIG. 5, in Example 3, the initial resistance ratio was 0.90. That is, by reducing the additive amount of the binder, the battery performance was improved more than Example 2.

As specifically described above, in the manufacturing method of the negative electrode according to the present embodiment, the granulated bodies 101 are deposited on the copper foil 102 by use of the film forming device 2 and the HRL paste 105 to which the binder is added is applied thereon by use of the HRL coating machine 3. Then, the drying step in which the undried negative electrode 106 to which the HRL paste 105 is applied is dried by the dryer 4 is performed. The drying step of the present embodiment includes the first drying step of drying the undried negative electrode 106 first, and the second drying step and the third drying step performed after that. The drying temperature in the first drying step is higher than the drying temperatures in the second drying step and the third drying step. That is, heating at a high temperature is performed at an early stage of the drying, so that migration of the HRL paste 105 is promoted, thereby resulting in that the binder gathers in the surface layer. Hereby, the bonding strength can be secured, and further, the battery performance is improved. Since the bonding strength can be secured, it is possible to reduce the additive amount of the binder. In this case, it is possible to further improve the battery performance. Further, the step of drying at a high temperature is only the first drying step, so that the copper foil 102 is less likely to burn. Accordingly, in terms of the manufacturing method of the negative electrode, including a step of applying a heat resistant layer to which the binder is added, the restraint of a decrease in battery performance can be expected.

Note that the present embodiment is merely an example and does not limit the disclosure. Accordingly, it goes without saying that the present disclosure can be altered or modified variously within a range that does not deviate from the gist of the disclosure. For example, the materials should be selected appropriately.

Further, in the present embodiment, the gravure coater 31 is used as the HRL coating machine 3, but a die coater may be used, or a roll coater may be used. Further, in the present embodiment, three drying furnaces are provided in one drying room 41, but separate drying rooms may be provided for respective drying furnaces.

Further, in the present embodiment, the first drying step is only a drying step performed by the first furnace 411, but the first drying step is not limited to this. That is, the drying should be performed at a high temperature at an early stage of the drying step. In view of this, the first furnace 411 and the second furnace 412 may be set to a high temperature, and only the third furnace 413 may be set to a low temperature, for example. Further, the dryer 4 including three drying furnaces is exemplified, but the number of drying furnaces is not limited to this and may be two or four or more.

What is claimed is:

1. A manufacturing method of a negative electrode, the manufacturing method comprising:
    forming, on a belt-shaped copper foil, an active material film formed such that powder including a negative-electrode active material is moisturized and granulated into granulated bodies and the granulated bodies are formed into a film shape;
    applying a pasty heat resistant layer including a binder and a filler onto the active material film, wherein a particle diameter of the binder is smaller than a particle diameter of the filler; and
    drying the active material film and the heat resistant layer, wherein:
    the drying of the active material film and the heat resistant layer includes a first step and a second step performed subsequently to the first step;
    a drying temperature to be used in the first step is set to a first temperature; and
    a drying temperature to be used in the second step is set to a second temperature lower than the first temperature.

2. The manufacturing method according to claim 1, wherein the first temperature is 150° C. or more and the second temperature is 120° C. or less.

3. The manufacturing method according to claim 1, wherein the first temperature is 180° C.

4. The manufacturing method according to claim 1, wherein an additive amount of the binder is 10 wt %.

5. The manufacturing method according to claim 1, wherein an additive amount of the binder is 4 wt %.

6. The manufacturing method according to claim 1, wherein the binder is acrylic-based emulsion.

* * * * *